US008655950B2

(12) United States Patent
Scherpa et al.

(10) Patent No.: US 8,655,950 B2
(45) Date of Patent: Feb. 18, 2014

(54) CONTEXTUAL AWARENESS IN REAL TIME COLLABORATIVE ACTIVITY ALERTS

(75) Inventors: Josef Scherpa, Fort Collins, CO (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 12/186,613

(22) Filed: Aug. 6, 2008

(65) Prior Publication Data

US 2010/0036929 A1 Feb. 11, 2010

(51) Int. Cl.
*G06F 15/16* (2006.01)

(52) U.S. Cl.
USPC ............................ 709/204; 709/207; 709/206

(58) Field of Classification Search
USPC ............... 704/278; 705/9; 364/191; 715/530; 709/204, 206–207
See application file for complete search history.

(56) References Cited

U.S. PATENT DOCUMENTS

| | | | | |
|---|---|---|---|---|
| 5,825,858 A * | 10/1998 | Shaffer et al. | ................. | 379/120 |
| 5,920,479 A * | 7/1999 | Sojoodi et al. | ................. | 700/86 |
| 6,230,171 B1 * | 5/2001 | Pacifici et al. | ................. | 715/201 |
| 6,708,292 B1 * | 3/2004 | Mangasarian | ................. | 714/39 |
| 6,961,918 B2 * | 11/2005 | Garner et al. | ................. | 716/139 |
| 7,356,565 B2 * | 4/2008 | Zimmermann et al. | ...... | 709/206 |
| 7,363,345 B2 * | 4/2008 | Austin-Lane et al. | ........ | 709/207 |
| 7,526,487 B1 * | 4/2009 | Bobbitt et al. | ........................ | 1/1 |
| 7,702,730 B2 * | 4/2010 | Spataro et al. | ................. | 709/205 |
| 2002/0188527 A1 * | 12/2002 | Dillard et al. | ................... | 705/27 |
| 2003/0065986 A1 * | 4/2003 | Fraenkel et al. | ................. | 714/47 |
| 2003/0085923 A1 * | 5/2003 | Chen et al. | ..................... | 345/751 |
| 2003/0131352 A1 * | 7/2003 | Dutta et al. | ...................... | 725/25 |
| 2003/0158864 A1 * | 8/2003 | Samn | ............................. | 707/200 |
| 2003/0185377 A1 * | 10/2003 | Tsukazoe et al. | ............. | 379/242 |
| 2004/0006748 A1 * | 1/2004 | Srivastava et al. | ............ | 715/530 |
| 2004/0017396 A1 | 1/2004 | Werndorfer et al. | | |
| 2004/0081183 A1 * | 4/2004 | Monza et al. | .................. | 370/412 |
| 2004/0083195 A1 * | 4/2004 | McCord et al. | ................. | 706/47 |

(Continued)

FOREIGN PATENT DOCUMENTS

| | | |
|---|---|---|
| EP | 1845673 A1 | 10/2007 |
| WO | 0124016 A1 | 4/2001 |
| WO | 2006028850 A2 | 3/2006 |
| WO | 2010015548 A1 | 2/2010 |

OTHER PUBLICATIONS

IBM: "Issuing alerts to contents of interest of a conference," filed as U.S. Appl. No. 12/556,667 on Sep. 10, 2009.

(Continued)

*Primary Examiner* — Krisna Lim
*Assistant Examiner* — Margishi Desai
(74) *Attorney, Agent, or Firm* — Cuenot, Forsythe & Kim, LLC

(57) ABSTRACT

A computer-implemented method of alerting users to collaborative activity can include receiving a user input selecting at least one of a plurality of data types to be included within a notification, wherein the plurality of data types correspond to collaborative session data exchanged during a collaborative session among a plurality of users. The method can include buffering collaborative session data during the collaborative session and responsive to detecting an occurrence of an awareness triggering event, outputting the notification comprising at least a portion of the buffered collaborative session data corresponding to the selected at least one of a plurality of data types.

20 Claims, 4 Drawing Sheets

(56) References Cited

U.S. PATENT DOCUMENTS

| | | | |
|---|---|---|---|
| 2004/0103165 A1* | 5/2004 | Nixon et al. | 709/217 |
| 2004/0267885 A1* | 12/2004 | Zimmermann et al. | 709/206 |
| 2005/0041793 A1* | 2/2005 | Fulton et al. | 379/211.01 |
| 2005/0084087 A1* | 4/2005 | Rajagopalan et al. | 379/205.01 |
| 2005/0097473 A1* | 5/2005 | Malik et al. | 715/739 |
| 2005/0169439 A1* | 8/2005 | Binning | 379/45 |
| 2006/0075039 A1* | 4/2006 | Narayanaswami et al. | 709/206 |
| 2006/0080432 A1* | 4/2006 | Spataro et al. | 709/224 |
| 2006/0133582 A1* | 6/2006 | McCulloch | 379/45 |
| 2006/0149558 A1* | 7/2006 | Kahn et al. | 704/278 |
| 2006/0155785 A1 | 7/2006 | Berry et al. | |
| 2006/0253531 A1* | 11/2006 | Kalley et al. | 709/204 |
| 2007/0064684 A1* | 3/2007 | Kottilingal | 370/355 |
| 2007/0106726 A1* | 5/2007 | Rosenberg | 709/204 |
| 2007/0124698 A1* | 5/2007 | Majumder | 715/811 |
| 2007/0156813 A1* | 7/2007 | Galvez et al. | 709/204 |
| 2007/0202859 A1* | 8/2007 | Ward | 455/414.1 |
| 2007/0255781 A1* | 11/2007 | Li et al. | 709/201 |
| 2007/0282951 A1* | 12/2007 | Selimis et al. | 709/205 |
| 2008/0040187 A1* | 2/2008 | Carraher et al. | 705/9 |
| 2008/0133501 A1* | 6/2008 | Andersen et al. | 707/5 |
| 2008/0147796 A1* | 6/2008 | Chmara et al. | 709/204 |
| 2008/0183645 A1* | 7/2008 | Burger et al. | 706/12 |
| 2008/0216125 A1* | 9/2008 | Li et al. | 725/62 |
| 2008/0244418 A1* | 10/2008 | Manolescu et al. | 715/753 |
| 2008/0244741 A1* | 10/2008 | Gustafson et al. | 726/23 |
| 2009/0016218 A1* | 1/2009 | Hong et al. | 370/231 |
| 2009/0112985 A1* | 4/2009 | Quinn et al. | 709/204 |
| 2009/0113310 A1* | 4/2009 | Appleyard et al. | 715/742 |
| 2009/0154659 A1* | 6/2009 | Morin | 379/48 |
| 2009/0170519 A1* | 7/2009 | Wilhoite et al. | 455/436 |
| 2009/0249226 A1* | 10/2009 | Manolescu et al. | 715/757 |
| 2009/0254358 A1* | 10/2009 | Li et al. | 705/1 |
| 2009/0254944 A1* | 10/2009 | Watson et al. | 725/58 |
| 2009/0265640 A1* | 10/2009 | Abernethy et al. | 715/751 |
| 2009/0319334 A1* | 12/2009 | Dhananjaya et al. | 705/10 |
| 2009/0327429 A1* | 12/2009 | Hughes et al. | 709/206 |
| 2010/0017619 A1* | 1/2010 | Errico | 713/186 |
| 2011/0060591 A1 | 3/2011 | Chanvez et al. | |

OTHER PUBLICATIONS

PCT Application No. PCT/EP2009/059743 International Preliminary Report, Feb. 8, 2011, 10 pgs.

PCT Application No. PCT/EP2009/059743 International Search Report, Feb. 1, 2010, 5 pgs.

* cited by examiner

CONTEXTUAL AWARENESS IN REAL TIME COLLABORATIVE ACTIVITY ALERTS

BACKGROUND

Access to, and the initiation of, a collaborative session between a group of users has been simplified by a wide variety of presently available collaborative tools and conferencing systems. Collaborative tools can include social networking applications, instant messaging (IM) applications, video-conferencing applications, Voice over Internet Protocol (VOIP) applications, media sharing applications, and the like. Using collaborative tools, a collaborative session can be established among a group of geographically separated users. In addition, a user can connect to a collaborative session, while still in the workplace of the user, and participate in a group discussion.

Collaborative applications also can be integrated within the structure of a conferencing system, further enhancing the interactive capabilities available to the users during the collaborative session. Modern conferencing systems can facilitate seamless operation between collaborative applications executing on networked servers, e.g., media servers and application servers, communicating over Internet gateways, the Public Switched Telephone Network (PSTN), and/or other networks. Users involved in a collaborative session using these conferencing systems can participate in a visual and/or auditory interaction, exchange text messages, exchange data files, or the like. For example, a conferencing system can establish a collaborative session between members of a geographically dispersed marketing team. During the collaborative session, team members can view a presentation by a manager, view files from one or more of the team members, share files between team members, and discuss issues related to a product line.

BRIEF SUMMARY OF THE INVENTION

The embodiments disclosed herein relate to contextual awareness during collaborative activity. One embodiment of the present invention can include a computer-implemented method of alerting users to collaborative activity. The method can include receiving a user input selecting at least one of a plurality of data types to be included within a notification, wherein the plurality of data types correspond to collaborative session data exchanged during a collaborative session among a plurality of users. The method can include buffering collaborative session data during the collaborative session and responsive to detecting an occurrence of an awareness triggering event, outputting the notification comprising at least a portion of the buffered collaborative session data corresponding to the selected at least one of a plurality of data types.

Another embodiment of the present invention can include a computer-implemented method of alerting users to collaborative activity. The method can include receiving a user input specifying an awareness triggering event including a state change in a collaborative session between a plurality of users and receiving a user input selecting at least one type of collaborative session data to be included within a notification. The selected type(s) of collaborative session data can be buffered during the collaborative session. The collaborative session further can be monitored for an occurrence of the awareness triggering event. Responsive to detecting an occurrence of the awareness triggering event, the notification including a portion of data for each of the at least one selected type(s) of collaborative session data can be displayed. The portion of data for each of the at least one selected type(s) of collaborative session data can be a predetermined amount of data accumulated prior to the detection of the occurrence of the awareness triggering event.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
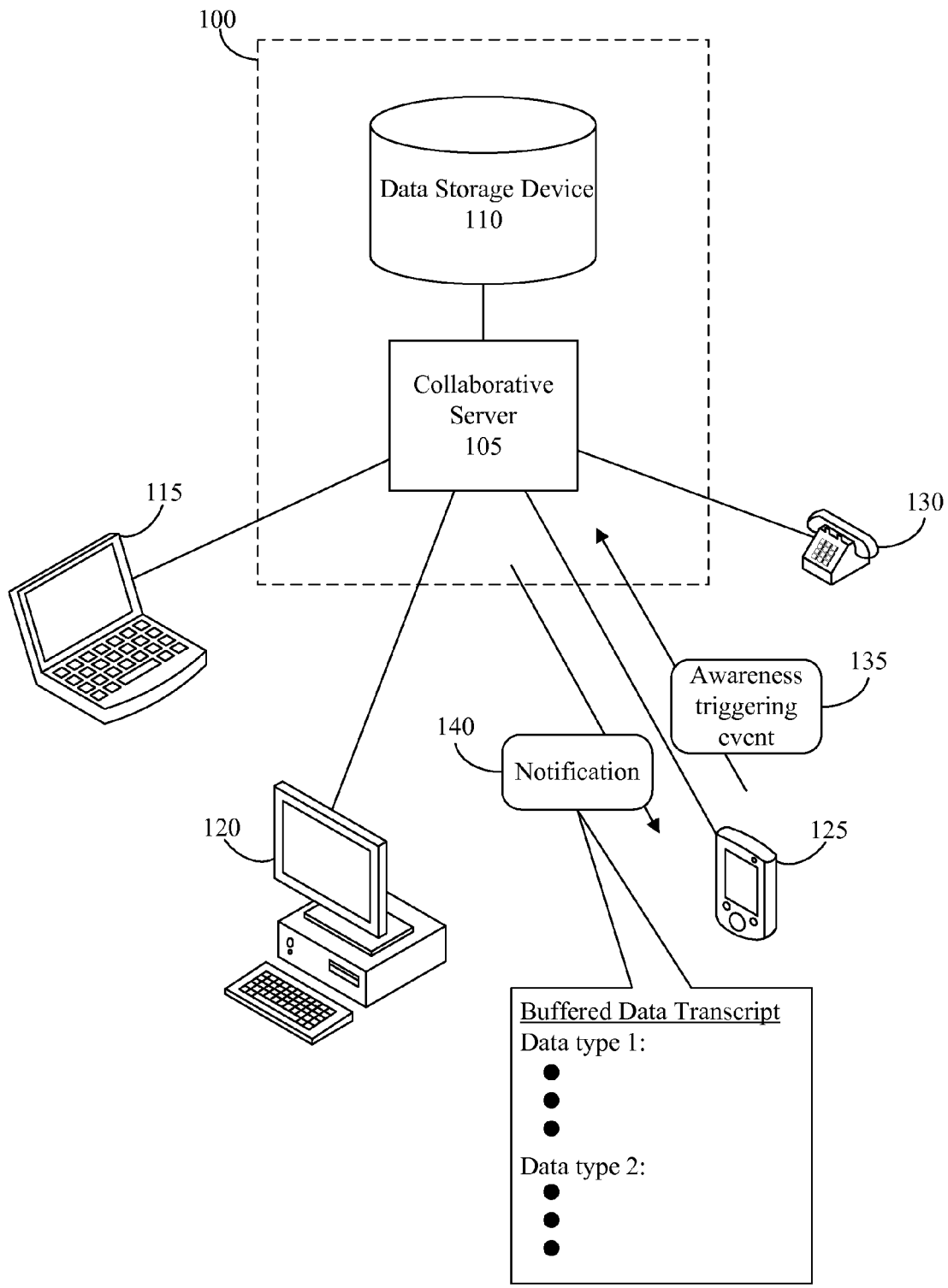
FIG. 1 is a block diagram illustrating a system for providing contextual awareness during collaborative sessions in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, magneto-optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed herein relate to alerting a user to relevant collaborative activity during a collaborative session. The wide availability of collaborative tools has enhanced the ability of the user to engage in a collaborative session involving multiple users. This ease of use has resulted in an increase in collaborative activity within home and work environments. The collaborative session can allow multiple users to interact collectively to share information, discuss topics of interest, solve problems, or the like, while often in geographically separate locations. A "session," as used herein, can refer to a semi-permanent interactive information exchange between a plurality of communicating devices that is established at a certain point in time, continues for a defined period of time, and ends at a later point in time, thereby disconnecting each participant.

The working environment of the user may require multiple activities directed at a variety of tasks and responsibilities. The preceding conditions can necessitate the user to multitask, moving between various undertakings. For example, a computing device of the user may be executing a collaborative session simultaneous to a variety of alternate applications, unrelated to the collaborative session, executing on the computing device. In addition, the user can multitask, alternating the awareness of the user between the collaborative session windows and the variety of alternate applications. As such, maintaining undivided attention to the collaborative session can prove difficult for the user as well as being an inefficient use of time of the user.

When the collaborative session concerns content not requiring the attention of the user, the user may attempt to maintain limited awareness of the collaborative session while simultaneously performing a task. Although vigilant for content of interest in the collaborative session, the user may be distracted by the task and an occurrence of content of interest in the collaborative session can go unnoticed. In that case, the user may overlook an opportunity to respond to the content of interest. In addition, even when the user is aware of the occurrence of content of interest, the context surrounding the appearance of the content of interest within the collaborative session may not be known to the user as a consequence of multitasking.

In accordance with the inventive arrangements disclosed herein, a user engaged in a collaborative session can specify an awareness triggering event. The awareness triggering event can alert the user to a change of state in the collaborative session meriting the awareness of the user returning to the collaborative session. Data exchanged between users in the collaborative session can be buffered as well as monitored for the awareness triggering event.

Upon the awareness triggering event being detected, the user can be notified of the occurrence of the awareness triggering event. A transcript of a portion of the buffered collaborative session data can be provided within the notification. Accordingly, the user can be provided with contextual information occurring prior to the user restoring attention to the collaborative session. As such, the user can be alerted to a change in the collaborative session and updated with a predetermined amount of content occurring prior to the awareness triggering event. In this manner, the user can be updated to the present state of the collaborative session responsive to detecting the awareness triggering event during the collaborative session.

FIG. 1 is a block diagram illustrating a system 100 for providing contextual awareness during a collaborative session in accordance with one embodiment of the present invention. The system 100 can include a collaborative server 105 and a data storage device 110 that can store collaborative session data. The collaborative server 105 can be implemented as any of a variety of data processing systems.

A data processing system can store and/or execute program code for performing the various functions described herein. Each data processing system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

It should be appreciated that collaborative server 105 can be implemented as one or more computing devices functioning individually, or in tandem with other computing devices, to carry out the operations associated with the collaborative session. Accordingly, while illustrated separately, the data storage device 110 can be integrated within the collaboration server 105 in the form of local memory, e.g., random access memory or other non-persistent memory, or as a bulk data storage device, e.g., a disc device or other form of persistent memory.

The collaborative server 105 can execute collaborative applications including, but not limited to, social networking applications, instant messaging (IM) applications, video-conferencing applications, Voice over Internet Protocol (VOIP) applications, media sharing applications, or the like, for use in coordinating a collaborative session between a plurality of users. In addition, the collaborative server 105 can perform functions such as establishing, maintaining, and terminating the collaborative session. For example, the collaborative server 105 can connect users to the collaborative session, route audio, visual, and/or multimedia data to selected users of the collaborative session, disconnect users from the collaborative session, or the like.

The collaborative server 105 can establish communication links with communication devices 115, 120, 125, and 130, thereby enabling each of communication devices 115-130 to communicate with each other communication device via a communication network (not shown). Communication devices 115-130 can be implemented as, for example, conventional telephones utilizing Plain Old Telephone Service (POTS), computers, mobile computing devices, mobile phones, wireless enabled personal digital assistants, other data processing systems, or the like. Each of communication devices 115-130 can serve as an interface through which each user exchanges collaborative session data with collaborative server 105 and with each other user during the collaborative session.

Depending upon the type of collaborative session being established, collaborative server 105 can perform functions such as speech recognition upon received voice data from a participant, recognize dual tone multi-frequency input received from the participant, and/or receive textual data from participants. The collaborative server 105 can process the received data and route or forward that data between one or more participants, e.g., via communication devices 115-130, in the collaborative session. Further, collaborative server 105 can store data exchanged or generated during the collaborative session as collaborative session data.

Collaborative session data can include, but is not limited to, IM text transcripts, text descriptions of collaborative events such as agenda item changes, entry and exit of session users to the collaborative session, files uploaded and/or processed during the session, task assignments, operations executed on presentation data and/or tools, visual events occurring during the collaborative session, or any other data generated during the collaborative session, or exchanged between participants of the session or at least one participant and the collaboration server 105. Additionally, the collaborative session data can include a speech recognized transcription of the audio content of the collaborative session.

Collaborative session data, stored in data storage device 110, can include a variety of data types exchanged during a collaborative session stored in a first format, wherein data can be stored in an original format generated during the collaborative session, and/or in a second format, wherein data in the original format can be processed by the collaborative server 105 and converted into a second format. For example, IM text exchanges can be buffered in the original format, e.g., first format, generated during the collaborative session. In another example, content from a first format, e.g., a slide, may be stored as plain text, e.g., the second format where content such as text is extracted and stored independently of the original format. Alternatively, the audio data, e.g., first format, exchanged during the collaborative session can be speech recognized and converted to a text transcript, e.g., second format, for storage in the data storage device 110. In another example, a state change in the collaborative session, e.g., a new participant entering the collaborative session, can be a first format and the conversion of the state change to a text description of the state change can be a second format.

In operation, a collaborative session between one or more or all of communication devices 115-130, and the users of such devices, can be established through collaborative server 105. A user at communication device 125 can initiate monitoring of the collaborative session by inputting an awareness triggering event 135 to the collaborative server 105. As used herein, an "awareness triggering event," can refer to any event that signifies a change of state, such as changes of content, topic, participant or speaker during a collaborative session that is of interest to a user, and suggests that the awareness of the user return to the collaborative session. Responsive to receiving the user input, the collaborative server 105 can begin monitoring the collaborative session for an occurrence of the awareness triggering event. Though described as being defined during the collaborative session, the awareness triggering event may also be set prior to a scheduled collaborative session and associated with the session. In either case, monitoring for the awareness triggering event can be automatically initiated once the collaborative session is established.

In addition, collaborative server 105 can buffer collaborative session data exchanged between communication devices 115-130 during the collaborative session and store the data in data storage device 110. The buffering of collaborative session data can begin at the initiation of the collaborative session or upon collaborative server 105 receiving the user request from communication device 125 specifying the awareness triggering event 135. Additionally, collaborative session data types to be buffered by the collaborative server 105 can be pre-determined by the system 100 and/or selected by the user concurrent to the selection of the awareness triggering event 135 via an input to communication device 125.

For example, at the initiation of the collaborative session, the collaborative server 105 can buffer all collaborative session data. Alternatively, only selected portions of collaborative session data can be buffered, such as a text transcript of IM exchanges between the users, and text descriptions of agenda item changes during the collaborative session. The choice of particular items or types of collaborative session data to be buffered can be predetermined by system 100 or selected by the user.

Continuing with the illustration, the collaborative server 105 can monitor for the occurrence of the awareness triggering event 135. The collaborative server 105 can monitor all, or a predetermined number of, data types in the collaborative session for the awareness triggering event 135. Responsive to detecting the awareness triggering event 135, the collaborative server 105 can output a notification 140 to the user indicating the occurrence of the awareness triggering event in the collaborative session. In one embodiment, the notification 140 can include the presentation of a transcript to the user. The notification 140 can alert the user to the detection of an occurrence of the awareness triggering event 135 as well as present a transcript including a predetermined portion of one or more or all collaborative session data types buffered in data storage device 110, occurring prior to the detection of the occurrence of the awareness triggering event.

For example, the user can select, e.g., on communication device 125, the connection of a manager to a collaborative session to be an awareness triggering event. The user can select instant messaging (IM) text exchanges between users in the collaborative session to be the collaborative session data type buffered, and the portion of buffered collaborative session data to be 20 lines of IM text. Responsive to the detection of the manager connecting to the collaborative session, collaborative server 105 can output a notification to communication device 125. The notification can include a message "Manager X has connected to the meeting" as well as a transcript of 20 lines of IM text exchanges, between users in the collaborative session, that occurred immediately prior to the connection of the manger to the collaborative session.

It should be noted that each user can select individualized or unique awareness triggering events. In addition, each user, working through one of the communication devices 115-130, can select a unique set of collaborative session data types to be buffered and/or a unique portion of collaborative session data to be included in the notification from collaborative server 105. As such, each communication device 115-130 can receive a unique notification from collaborative server 105, wherein each notification can include a transcript presenting a unique set of collaborative session data types and a unique portion of each collaborative session data type, upon detection of the occurrence of the awareness triggering event. Further, collaborative session data buffered may differ from collaborative session data presented to users in the notification. Collaborative session data buffered and collaborative session data presented in the notification may also vary according to the type of collaborative session.

It should be noted that the particular collaborative session data types selected to be buffered, presented in the notification 140, and/or monitored for the awareness triggering event 135 can be the same or linked, e.g. selected with the same user input, or independent of each other and as such selected separately, with different operations preformed on each collaborative session data type by system 100. Further, the size of the portion of each collaborative session data type to be buffered or presented can be linked or independent of each other, although the size of the presented portion may not exceed the size of the buffered portion. For example, system 100 can buffer all data exchanged during the collaborative session, making all data types available for monitoring for the occurrence of the awareness triggering event 135 and presentation in the notification 140 to the user. Alternatively, the collaborative session data types monitored for the awareness triggering event 135 can be distinct from the buffered collaborative session data types and the data types presented in the notification 140 may not include all of the buffered collaborative session data types.

Figure 2:
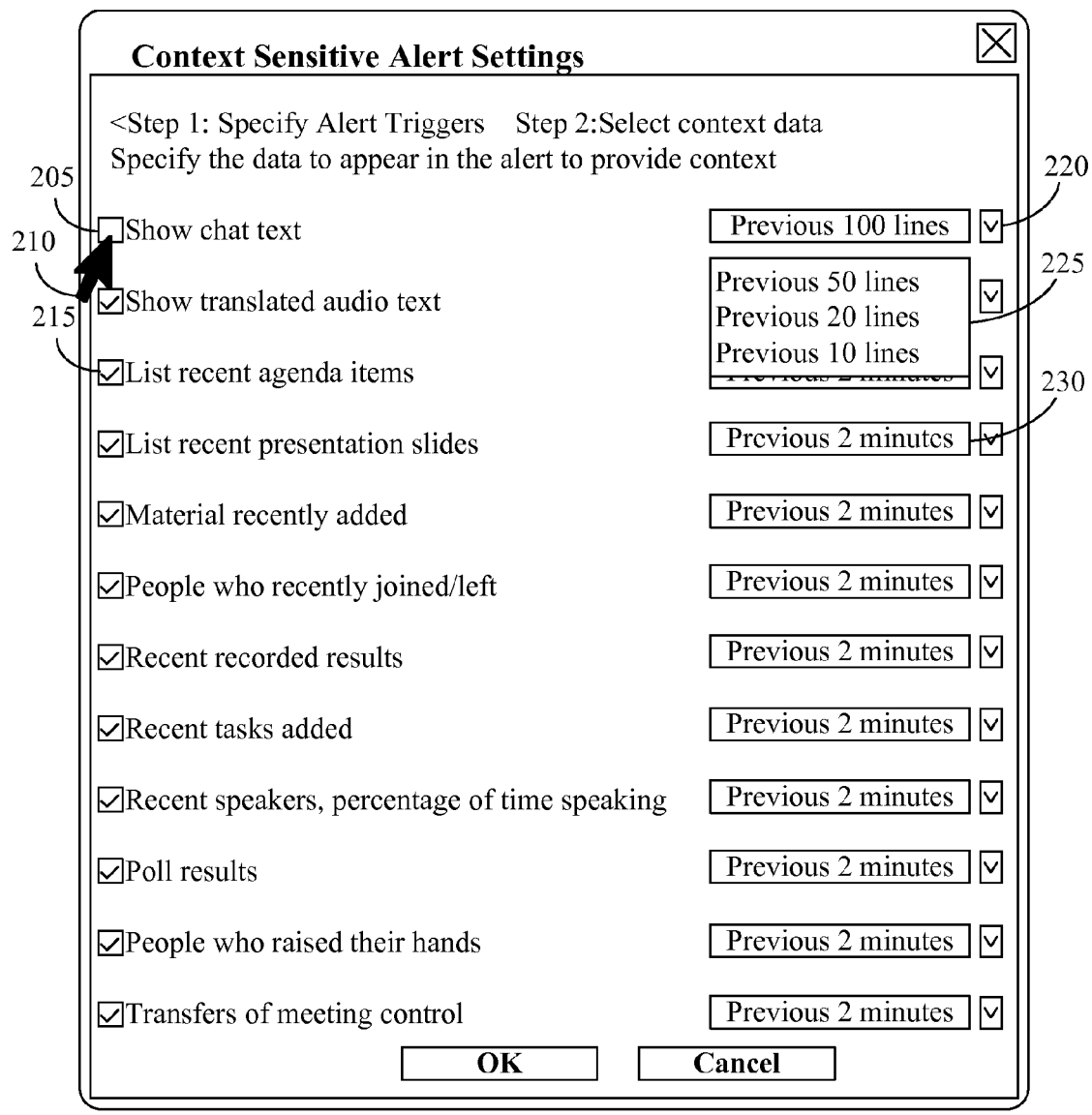
FIG. 2 is pictorial view illustrating a graphical user interface (GUI) for specifying collaborative session data types in accordance with another embodiment of the present invention.

FIG. 2 is pictorial view illustrating a graphical user interface (GUI) 200 for specifying a collaborative session data types in accordance with another embodiment of the present invention. The GUI 200 can be generated during the collaborative session on a system as described herein with reference to FIG. 1. The GUI 200 can represent an interface through which the user can select collaborative session data types to be included in a notification to the user of a state change occurring during the collaborative session.

As such, the GUI 200 can present, to the user, a list of collaborative session data types that may be exchanged between participants of the collaborative session, which can be selected by the user for inclusion in the notification to the user of an occurrence of a state change in the collaborative session. In one embodiment, the GUI 200 can be presented to the user, by the system, responsive to the user inputting an awareness triggering event to the system via a communication device. Upon the GUI 200 being presented to the user, the user can select each particular collaborative session data type to be included in the notification by the system, using a pointer 210. "Check boxes," on the left side of GUI 200, specify whether an associated data type will be included in the notification. For example, the user can select data type check box (check box) 205, using pointer 210, and invoke the inclusion of the collaborative session data type "chat text" in the notification. Upon selecting check box 205 with pointer 210, a check will appear in check box 205 displaying to the user the selection of that particular data type, as can be seen in check box 215 for the collaborative session data type "recent agenda items."

Having selected particular collaborative session data types, the user can select the portion of each selected collaborative session data type to be presented in the notification. As noted, the portion of each selected collaborative session data type presented in the notification may include all or part of the data buffered for that selected collaborative session data type. The drop down menus, on the right of GUI 200, specify the amount of each selected collaborative session data type that can be included in the notification.

For example, using pointer 210, the user can select box 220. Responsive to the selection of box 220, drop down menu 225 can be presented to the user. Using pointer 210, the user can select from the drop down menu 225 a number of lines of chat text, occurring prior to the detection of an occurrence of the awareness triggering event, to be presented in the notification. Although the portion of the collaborative session data type, e.g., chat text, can be selected according to the number of lines prior to the detection of the occurrence of the awareness triggering event, the determination of the "size" of the portion of buffered collaborative session data can be described in other terms as well. For example in box 230, the "size" of the portion of the buffered collaborative session data type "List recent presentation slides" to be presented can be selected in terms of time, e.g., to present the slides or content of all slides presented within the last two minutes as opposed to the last 3, 4, 5, etc. slides. As such, the determination of the "size" of the portion of a particular collaborative session data type can vary according to each collaborative session data type.

The implementation of GUI 200 shown is intended as an example, and as such is not intended to limit the disclosed embodiments described within this specification. Various styles of GUIs can be implemented to provide the same functionality and/or additional functionalities to the system.

Figure 3:
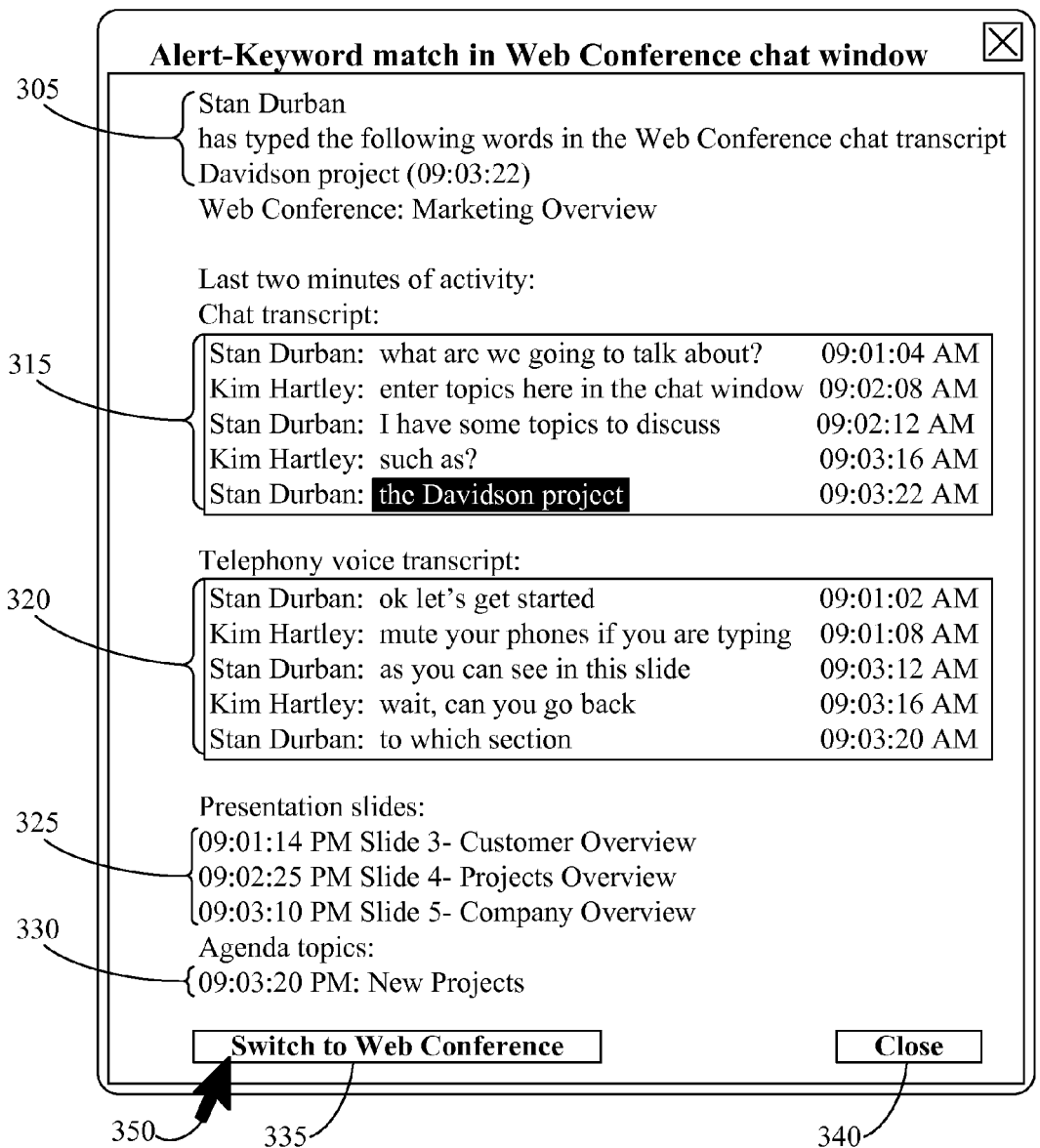
FIG. 3 is pictorial view illustrating a notification presented during a collaborative session in accordance with another embodiment of the present invention.

FIG. 3 is a pictorial view illustrating a notification 300 presented during a collaborative session in accordance with another embodiment of the present invention. The notification 300 can be presented during the collaborative session on a system as described herein with reference to FIG. 1. In the embodiment that follows, the notification 300 can be presented responsive to the detection of an occurrence of an awareness triggering event. The information presented in notification 300 can result from a user input selecting the awareness triggering event as well as types, and amount, of collaborative session data to be presented, e.g., as described in FIG. 2 using GUI 200.

In this example, the awareness triggering event is a keyword appearing in a chat transcript of the collaborative session. A "keyword," as used herein, can refer to any portion of text, whether formed of alphanumeric characters, symbols, or multiple words. In this case, the occurrence of the keyword "Davidson project" represents a change of state in the collaborative session of interest to the user. Responsive to the detection of an occurrence of the keyword within the collaborative session, notification 300 can automatically be presented, alerting the user to a change of topic in the collaborative session of interest to the user and prompting the user to return awareness to the collaborative session.

Section 305 provides a text description of the detection of the occurrence of the keyword "Davidson project." Section 305 indicates that the keyword was detected within the collaborative session data type "chat transcript." In this manner, the collaborative session data type within which the keyword was located, e.g., the source of the detection of the occurrence of the awareness triggering event, can be identified and presented to the user. Section 305 also presents to the user a time the keyword was detected and the participant that input the keyword. The notification 300 further can include a transcript of a portion of various buffered collaborative session data types exchanged by the users of the collaborative session prior to the occurrence of the keyword. The notification 300 indicates that the last two minutes of each selected collaborative session data types are displayed in the transcript. As noted, the determination that two minutes of each collaborative session data type are to be presented can be predetermined by the system and/or selectable by the user.

Sections 315, 320, 325, and 330 present portions of the collaborative session transcript segmented according to collaborative session data type. Each of sections 315-330 can present a unique and different collaborative session data type as specified through FIG. 2. In each of sections 315-330 the detected location of the awareness triggering event, e.g., keyword "Davidson project," within the transcript section for each collaborative session data type can be highlighted. As such, the initial detection of the occurrence of the awareness triggering event occurs, indicated in section 315, is highlighted. This detection is noted in section 305. Sections 315-330 can provide the user with an overview of the collaborative session prior to the occurrence of the awareness triggering event during the collaborative session.

Notification 300, further, can include buttons 335 and 340 selectable by the user with pointer 350. Responsive to the user selecting button 335, the user can be returned to the collaborative session and the user directly interacting with the contents of the session. This can be implemented by making the collaborative session window the active window. In such case, the collaborative session window can replace or be superimposed over notification 300. In addition, notification 300 can be left open or closed upon selection of button 335. Responsive to selecting button 340 with pointer 350, the system can close notification 300 and cease monitoring of the collaborative session for the awareness triggering event.

It should be appreciated that the user can select two or more awareness triggering events for which the system can monitor during the collaborative session. Accordingly, the system can present notification 300 subsequent to a detection of the occurrence of one of the two or more awareness triggering events or responsive to a user-specified combination of two or more of the awareness triggering events either being detected simultaneously and/or on separate occasions, but within a specified time interval.

The implementation of Notification 300 as shown is intended as an example, and as such is not intended to limit the embodiments disclosed within this specification. Various styles of GUIs can be implemented to provide the same and/or additional functionality to the system.

Figure 4:
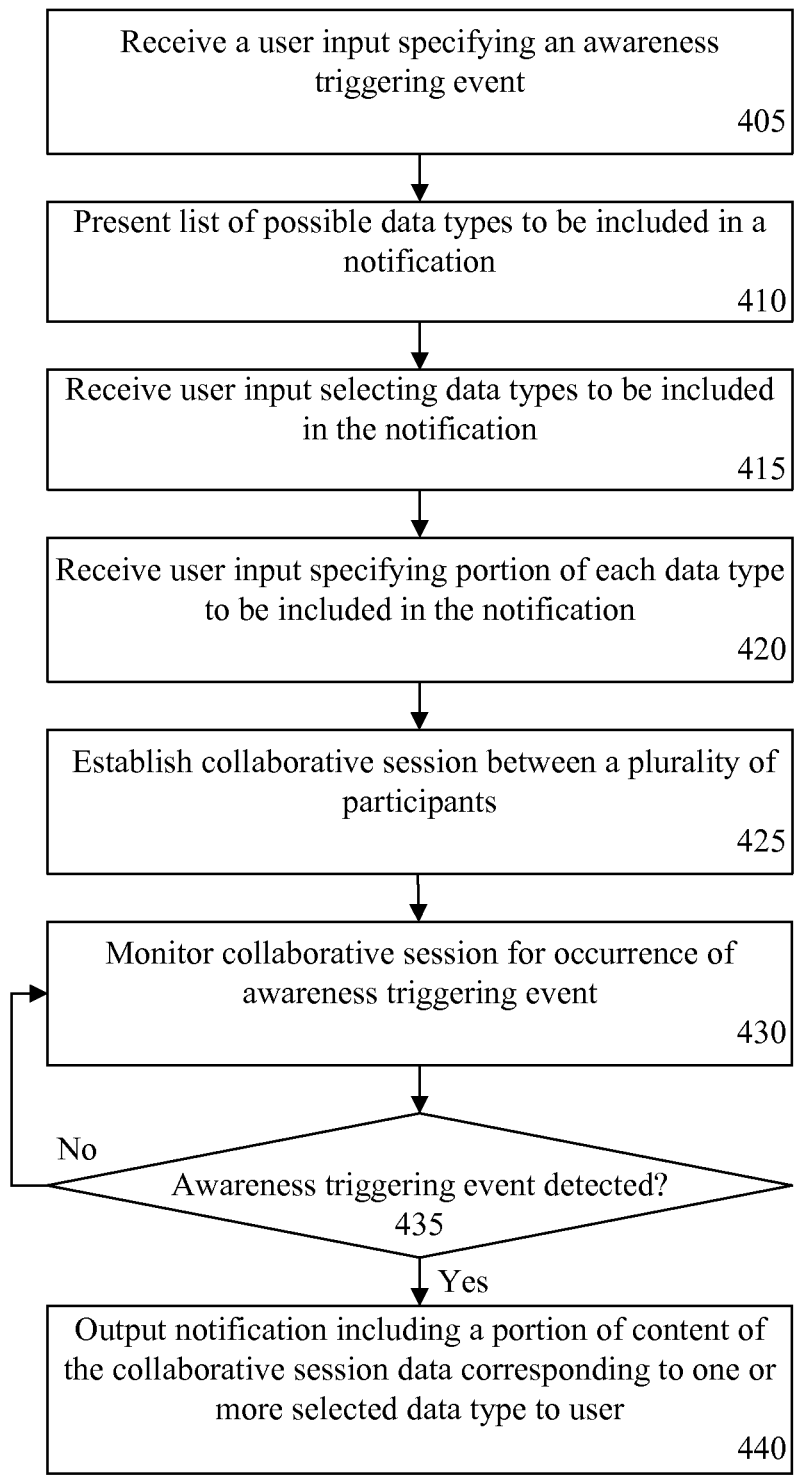
FIG. 4 is a flow chart illustrating a method of providing contextual awareness during a collaborative session in accordance with another embodiment of the present invention.

FIG. 4 is a flow chart illustrating a method 400 of providing contextual awareness during a collaborative session in accordance with another embodiment of the present invention. The method 400 can be implemented using a system as described with reference to FIG. 1 or any other system with the same or similar functionality.

Accordingly, in step 405, the system can receive a user input specifying an awareness triggering event. Examples of awareness triggering events can include, but are not limited to, an occurrence of a keyword in the collaborative session, a change to a new agenda item during the collaborative session, interactions with files used in the collaborative session such as the uploading of a file to the system, the downloading of a file from the system, or the sharing of a file between participants in the collaborative session, the joining of a new participant to the collaborative session, the exit of a participant from the collaborative session, the identification of a geographical location of a participant in the collaborative session, identification of a change of collaborative session speaker, changes to the collaborative session agenda, a changing of visual content being presented during the collaborative session, a user input causing or invoking some programmatic action, any other event and/or activity related to the collaborative session.

In step 410, the system can present a list of possible collaborative session data types that may be included within the notification. In step 415, the system can receive a user input selecting one or more collaborative session data types to be included within the notification. As noted herein, the collaborative session data types can be selected for buffering by default, e.g., where each type of collaborative session data is automatically buffered or in consequence of the collaborative session data type being selected for presentation in a notification. As noted, each collaborative session data type may be buffered independently of the inclusion of that collaborative session data type within the notification.

In step 420, the system can receive a user input specifying a portion, e.g., an amount, of each collaborative session data type to be buffered. As noted herein, the size of the portion of data buffered for each collaborative session data type can differ as well as the unit of measure used in specifying the size, e.g., 2 minutes of data as opposed to 10 lines of data.

In step 425, a collaborative session can be established between a plurality of participants. Although, the selection of the awareness triggering event, the collaborative session data types to be buffered, and the size of the portion of each selected collaborative session data type to be buffered is illustrated in FIG. 4 as occurring prior to the initiation of the collaborative session, the selection process may also occur subsequent to the initiation of the collaborative session. In addition, each of the selected items mentioned may be specified and/or modified at any time during the collaborative session. For example, the awareness triggering event could be changed from the keyword "Davidson project" to the keyword "Schmitt project." In another example, the length of time a particular collaborative session data type will be buffered and/or the amount of buffered data to be included within a notification can be changed, e.g., from two minutes to ten minutes.

In step 430, the system can begin monitoring the collaborative session for an occurrence of the awareness triggering event. The collaborative session data types monitored by the system for the awareness triggering event may not be limited to the set of collaborative session data types selected for buffering. Although, a limited number of collaborative session data types may be selected for buffering, the system may monitor all collaborative session data types exchanged during the collaborative session or a subset of all collaborative session data types that includes more collaborative session data types than were selected for buffering. For example, the collaborative session data that is monitored during the collaborative session may be real-time data exchanged among the participants or any other data generated during the collaborative session, including any media streams, as opposed to collaborative session data that has been buffered for purposes of inclusion within any future notifications.

In this regard, the collaborative session data types selected for buffering can be distinct from the collaborative session data types monitored for the awareness triggering event. For example, the user may select the collaborative session data types of IM text exchanges and a transcript of the changes to a presentation document to be the collaborative session data types to be buffered and select the arrival of a group member to the collaborative session as the awareness triggering event. As such, the system will buffer the selected collaborative session data types and monitor the collaborative session data type of participants entering and leaving the collaborative session for the arrival of the group member, a collaborative session data type not selected for buffering.

In decision box 435, the system can determine whether the awareness triggering event has been detected. If so, the method 400 can continue to step 440. If not, the method 400 can return to step 430 and continue monitoring for the awareness triggering event. In step 440, the system can output a notification including at least a portion of the buffered collaborative session data corresponding to each of at least one selected collaborative session data type to the user. As used herein, "output" or "outputting" can include, but is not limited to, storing data in memory, e.g., writing to a file, writing to a user display or other output device, e.g., playing audible notifications, sending or transmitting to another system, exporting, or the like. It should be appreciated that the notification can present a portion of buffered data that may be less than the total amount of data buffered for a particular collaborative session data type. For example, the user can select 20 lines of data to be buffered for a particular collaborative session data type, however, only 10 lines of data may be presented in the notification.

For example, it may be the case that the system continually buffers all collaborative session data types for the entire duration of the collaborative session. In that case, the portion of each collaborative session data type selected by a user for inclusion in the notification will be determined according to the user's specification of an amount to be presented, which is independent of the amount of the data that is buffered for each respective collaborative session data type in the notification.

The flowchart(s) and block diagram(s) in the figures illustrate the architecture, functionality, and operation of possible implementations of systems, methods, and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of alerting users to collaborative activity, the method comprising:
receiving a user input selecting at least one of a plurality of data types to be included within a notification, wherein the plurality of data types correspond to collaborative session data exchanged during a collaborative session among a plurality of users;
buffering collaborative session data during the collaborative session; and
responsive to detecting an occurrence of an awareness triggering event, outputting the notification comprising at least a portion of the buffered collaborative session data corresponding to the selected at least one of a plurality of data types.

2. The computer-implemented method of claim 1, further comprising receiving a user input specifying the awareness triggering event, wherein the user specified awareness triggering event is monitored to detect the occurrence of the awareness triggering event.

3. The computer-implemented method of claim 2, wherein receiving a user input specifying the awareness triggering event further comprises receiving a user input specifying an occurrence of a keyword in the collaborative session data to be the awareness triggering event.

4. The computer-implemented method of claim 2, wherein receiving a user input specifying the awareness triggering event further comprises receiving a user input specifying a state change that occurs during the collaborative session to be the awareness triggering event.

5. The computer-implemented method of claim 1, further comprising receiving a user input specifying an amount of the buffered collaborative session data for each selected data type to be included within the notification.

6. The computer-implemented method of claim 5, wherein responsive to detecting an occurrence of an awareness triggering event, outputting the notification comprising at least a portion of the buffered collaborative session data corresponding to the selected at least one of a plurality of data types further comprises outputting, within the notification, the user specified amount of the buffered collaborative session data for each selected data type.

7. The computer-implemented method of claim 1, wherein collaborative session data comprises audio data, wherein buffering collaborative session data during the collaborative session further comprises:
   speech recognizing the audio data to generate a text transcription; and
   buffering the text transcription as part of the buffered collaborative session data.

8. The computer-implemented method of claim 1, wherein buffering collaborative session data during the collaborative session further comprises:
   compiling messages exchanged between participants in the collaborative session to generate a chat text transcript; and
   buffering the chat text transcript of the collaborative session as part of the buffered collaborative session data.

9. The computer-implemented method of claim 1, wherein buffering collaborative session data during the collaborative session further comprises:
   detecting a state change during the collaborative session;
   generating a text description for each state change; and
   buffering the text description as part of the buffered collaborative session data.

10. The computer-implemented method of claim 1, wherein responsive to detecting an occurrence of an awareness triggering event, outputting the notification comprising at least a portion of the buffered collaborative session data corresponding to the selected at least one of a plurality of data types further comprises:
   for each selected data type, selecting a predetermined amount of collaborative session data accumulated prior to detection of the occurrence awareness triggering event; and
   displaying, within the notification, the predetermined amount of collaborative session data for each selected data type.

11. A computer-implemented method of alerting users to collaborative activity, the method comprising:
   receiving a user input specifying an awareness triggering event comprising a state change in a collaborative session between a plurality of users;
   receiving a user input selecting at least one type of collaborative session data to be included within a notification;
   buffering the at least one selected type of collaborative session data during the collaborative session;
   monitoring the collaborative session for an occurrence of the awareness triggering event; and
   responsive to detecting an occurrence of the awareness triggering event, displaying the notification comprising a portion of data for each of the at least one selected type of collaborative session data, wherein the portion of data for each of the at least one selected type of collaborative session data is a predetermined amount of data accumulated prior to the detection of the occurrence of the awareness triggering event.

12. The computer-implemented method of claim 11, wherein receiving a user input selecting at least one type of collaborative session data to be included within a notification further comprises presenting a list of collaborative session data types, exchangeable during the collaborative session, from which the collaborative session data to be included within the notification is selected.

13. The computer-implemented method of claim 11, wherein responsive to detecting an occurrence of the awareness triggering event, displaying the notification comprising a portion of data for each of the at least one selected type of collaborative session data, wherein the portion of data for each of the at least one selected type of collaborative session data is a predetermined amount of data accumulated prior to the detection of the occurrence of the awareness triggering event further comprises receiving a user input specifying the predetermined amount of data to accumulate.

14. A computer program product comprising:
   a computer-readable storage device comprising computer-usable program code that, when executed by a system comprising a processor and a memory, alerts users to collaborative activity, the computer-readable storage device comprising:
   computer-usable program code that receives a user input selecting at least one of a plurality of data types to be included within a notification, wherein the plurality of data types correspond to collaborative session data exchanged during a collaborative session among a plurality of users;
   computer-usable program code that buffers collaborative session data during the collaborative session; and
   computer-usable program code that responsive to detecting an occurrence of an awareness triggering event, outputs the notification comprising at least a portion of the buffered collaborative session data corresponding to the selected at least one of a plurality of data types.

15. The computer program product of claim 14, further comprising computer-usable program code that receives a user input specifying the awareness triggering event, wherein the user specified awareness triggering event is monitored to detect the occurrence of the awareness triggering event.

16. The computer program product of claim 15, wherein the computer-usable program code that receives a user input specifying the awareness triggering event further comprises computer-usable program code that receives a user input specifying an occurrence of a keyword in the collaborative session data to be the awareness triggering event.

17. The computer program product of claim 15, wherein the computer-usable program code that receives a user input specifying the awareness triggering event further comprises computer-usable program code that receives a user input specifying a state change that occurs during the collaborative session to be the awareness triggering event.

18. The computer program product of claim 14, wherein collaborative session data comprises audio data, wherein the computer-usable program code that buffers collaborative session data during the collaborative session further comprises:
   computer-usable program code that speech recognizes the audio data to generate a text transcription; and
   computer-usable program code that buffers the text transcription as part of the buffered collaborative session data.

19. The computer program product of claim 14, wherein the computer-usable program code that buffers collaborative session data during the collaborative session further comprises:
    computer-usable program code that compiles messages exchanged between participants in the collaborative session to generate a chat text transcript; and
    computer-usable program code that buffers the chat text transcript of the collaborative session as part of the buffered collaborative session data.

20. The computer program product of claim 14, wherein the computer-usable program code that responsive to detecting an occurrence of an awareness triggering event, outputs the notification comprising at least a portion of the buffered collaborative session data corresponding to the selected at least one of a plurality of data types further comprises:
    computer-usable program code that for each selected data type, selects a predetermined amount of collaborative session data accumulated prior to detection of the occurrence of the awareness triggering event; and
    computer-usable program code that displays, within the notification, the predetermined amount of collaborative session data for each selected data type.

\* \* \* \* \*